United States Patent Office 3,299,141
Patented Jan. 17, 1967

3,299,141
N-HYDROXYALKYL-N-ALKYNYL-N-ALKYL- AND ARALKYL AMINES AND PROCESS FOR THE PREPARATION THEREOF
Willard Joseph Croxall, Elkhart, Ind., assignor to Miles Laboratories, Inc., Elkhart, Ind., a corporation of Indiana
No Drawing. Filed Dec. 9, 1963, Ser. No. 329,235
15 Claims. (Cl. 260—570.9)

This application is a continuation-in-part of Serial No. 805,353, filed April 10, 1959, now abandoned, which in turn was a continuation-in-part of applications Serial No. 672,571, filed July 18, 1957, now abandoned, and Serial No. 716,854, filed February 24, 1958, now abandoned. This invention relates to novel acetylenic amino compounds and process for their preparation. More particularly, it relates to alkynyl aminoalkanols and bis(alkynyl) hydrocarbon amines and their process of preparation.

In accordance with the present invention novel compounds have been prepared selected from the class consisting of compounds having the formulae:

(1)
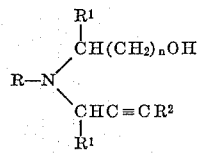

and (2)
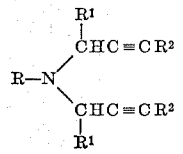

wherein R may be an alkyl, aryl, alkaryl or aralkyl radical, $R^1$ may be a hydrogen atom or a radical defined for R above, $R^2$ may be a hydrogen atom, alkyl, alkenyl, aryl, aralkyl, alkaryl, hydroxyalkyl, or hydroxycycloalkyl radical and $n$ is an integar from 1 to 2 inclusive.

Illustrative of the radicals that are represented by R and $R^1$ in the formulae above are alkyl groups, such as methyl, ethyl, isopropyl, octyl, dodecyl, octadecyl, eicosyl and the like; aryl groups, such as phenyl, naphthyl, terphenyl and the like; alkaryl groups, such as styryl, tolyl, n-hexylphenyl and the like; and aralkyl groups, such as benzyl, phenylethyl and the like. R is preferably phenyl, benzyl or an alkyl radical containing from 1 to 8 carbon atoms. $R^1$ is preferably phenyl, benzyl or an alkyl radical containing from 1 to 4 carbon atoms.

Illustrative of the radicals that are represented by $R^2$ in the formulae above are the radicals listed above for R and $R^1$ as well as the alkenyl groups, such as vinyl, allyl and the like; hydroxyalkyl radicals, such as hydroxymethyl, hydroxyethyl, hydroxyisopropyl and the like; and hydroxycycloalkyl radicals, such as hydroxycyclohexyl and the like.

The alkynyl aminoalkanols represented by Formula 1 above have a great number of applications. Especially, they are useful as intermediates for further synthetic work. This is due to the presence of three highly reactive groups in the molecule: the acetylenic group, the amino group, and the hydroxyl group, all of which may be reacted with various known reagents in the classical reactions of these compounds. For example, when $R^2$ above is hydrogen, the acetylenic aminoalkanols undergo all the classical acetylenic reactions such as ethynylation, vinylation, carbonylation and the like. When $R^2$ is an alkyl radical, for example, the compounds undergo addition reactions, such as halogenation, hydrogenation, and the like. When desired, the compounds may be subjected to the classic tertiary amine reactions such as the formation of salts, the formation of quaternary ammonium compounds and the like. The hydroxyl group may be utilized to form esters, ethers, metal alcoholates and the like. The compounds of Formula 1 abope also have utility as pharmacological compositions. In the form of non-toxic, water-soluble acid addition salts having pharmaceutically acceptable anions, particularly in the form of hydrochlorides, these compounds have hypnotic and/or sedative properties when administered to animals. Such pharmacological solutions are prepared by well known techniques. Furthermore, the compounds of Formula 1 are also useful as curing agents for the curing of epoxy resins and the like.

The bis(alkynyl) hydrocarbon amines represented by Formula 2 above are useful as surfactants since they reduce the surface tension when added to aqueous solutions.

The compounds of the present invention can be prepared by a novel process. This process comprises reacting a compound selected from the class of compositions having the formulae:

(3)
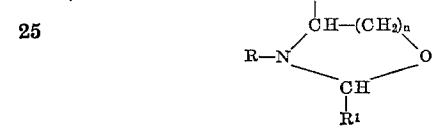

(4)

and (5)
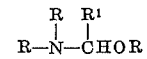

wherein R, $R^1$ and $n$ are defined above with an acetylenic compound having the formula $HC \equiv CR^2$ wherein $R^2$ is defined above, in the presence of cuprous ions, and recovering the desired product. This process proceeds in accordance with one of the following equations depending on the starting materials:

(6)
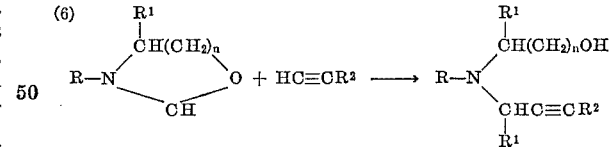

(7)
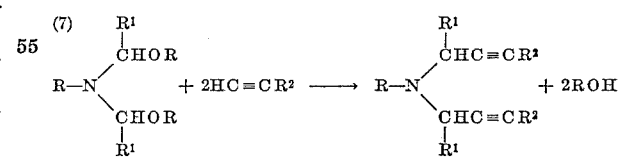

(8)
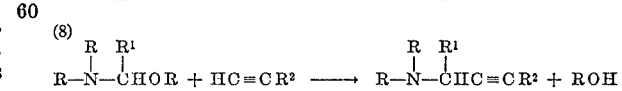

wherein R, $R^1$, $R^2$ and $n$ are defined above.

The fundamental nature of this reaction consists of cleaving the carbon-oxygen bond which is in the position alpha to an amino nitrogen atom. The acetylenic hydrogen atom combines with the oxygen atom from the above cleavage to form a hydroxyl group and the ethynyl radical attaches to the carbon atom from the above cleavage to form an alkynyl group. In Equation 6 above, a heterocyclic ring is split and the resulting hydroxyl and ethynyl radicals are attached to the free ends of the split ring. In Equations 7 and 8, the cleavage of the carbon-oxygen bond results in an alcohol by-product.

The reaction conditions for carrying out the present process are not narrowly critical. The reaction proceeds exothermically and temperatures from about −10° C. to about 100° C. can be employed. A preferable temperature range is from about 0° C. to about 30° C. In those reactions wherein acetylene itself is used, a reaction temperature of from about 0° C. to about 10° C. is preferable to minimize the formation of high-boiling by-product tars caused by polymerization of the acetylene. Temperature control is less critical when substituted acetylenes are used in the process.

The process may be carried out under a wide range of pressures from sub-atmosphere to super-atmospheric pressures. Ordinarily, the process proceeds smoothly at pressures from about atmospheric to about 14 inches of mercury above atmospheric pressure. Preferably, a pressure of about 3 to 10 inches of mercury above atmospheric is employed.

Since the acetylenic reactant compound is ordinarily a gaseous material, diluting gases, such as nitrogen and other inert gases, may be used in order to minimize the possibility of an explosion.

Although the process of the present invention will proceed in the absence of a solvent, it has been found that the reaction proceeds more smoothly and under better control when a solvent is present. Any solvent for the amino starting material can be employed, such as dioxane, dimethylformamide, acetone and the like. Dimethylformamide is the preferred solvent. Generally about 1 to about 5 parts by weight of solvent are employed for each part by weight of the amino starting material. When dioxane is used as a solvent, it is generally preferable to use 2 to 3 parts by weight of solvent for each part by weight of the amino starting material.

An essential feature of the present process is that the reaction be carried out in the presence of cuprous ions. These cuprous ions form a catalytic copper complex with the acetylenic reactant compound. The cuprous ions may be obtained from any copper salt which dissociates in the reaction mixture to provide the requisite cuprous ions. For example, cuprous chloride, cuprous sulfate and the like, can be used.

In general, the process is carried out by dissolving the amino starting material in the desired solvent and adding the dissociable cuprous salt. When the temperature and pressure have been adjusted to the desired values, the acetylenic compound is passed into the reaction mixture with stirring until such time as the desired amount has been added. A rapid absorption of the acetylenic compound and a mild exothermic reaction takes place. Generally, a brightly-colored copper-acetylene complex precipitate is formed. This material is filtered from the reaction mixture. It is the preferred procedure to then pass gaseous hydrogen sulfide through the reaction mixture to precipitate any residual cuprous ions. It is to be recognized, of course, that any other suitable means may be used to tie up and remove the excess cuprous ions. Decolorizing carbon is also added and then removed by filtration from the desired product filtrate. This filtrate is then distilled to remove any solvent. The desired product is then distilled from the residue. Product work-up is completed by any of the methods known to the art. These methods include redistillation, recrystallization and the like. The product obtained is identified or characterized by means of non-aqueous titration to obtain molecular weight, hydrogenation to check the amount of hydrogen taken up, and other methods, such as measurement of boiling point and refractive index, with which the art is familiar.

The amino compounds used as starting materials in the present process are well known and are prepared by known techniques. For example, the heterocyclic amines represented by Formula 3 can be prepared by reacting an aldehyde or ketone with a lower aminoalcohol. The resulting Schiff's base is then subjected to catalytic hydrogenation in the presence of a suitable hydrogenation catalyst. The resulting intermediate compound is then condensed with an aldehyde to form the desired heterocyclic compound with the elimination of a molecule of water. The starting materials represented by Formula 4 can be prepared by reacting a primary amine with an alcohol and an aldehyde. The starting materials represented by Formula 5 can be prepared by reacting a secondary amine with an alcohol and an aldehyde. Acetylene and the substituted acetylenes used as the other reactant are also well known and are prepared by well known techniques.

The novel compositions of this invention and the process for their preparation are further explained with reference to the following illustrative but not limitative examples.

I. ACETYLENIC AMINOETHANOLS

*Example I.—N-isobutyl-N-2-propynyl-2-amino-1-ethanol*

A. *Preparation of 3-isobutyloxazolidine.*—There were placed in a one-liter, three-necked flask, equipped with a stirrer, a thermometer and a Dean-Starke trap for the removal of water and surmounted by a reflux condenser, 200 ml. of benzene, 122 g. of aminoethanol and 144 g. of isobutyraldehyde. The mixture was stirred and refluxed for 5 hours, during which time 36 ml. of water separated in the Dean-Starke trap. The flask was then set up for distillation and all of the solvent benzene was distilled off. To the residue there were then added 300 ml. of methanol and 0.2 g. of platinum catalyst, and the mixture was hydrogenated on a Parr shaker at room temperature. When the theoretical amount of hydrogen had been absorbed, the solution was filtered from the catalyst, the methanol removed by distillation and the residue distilled. There were obtained 181 g. of N-isobutylaminoethanol. This material was charged to a flask equipped as described above. Then 250 ml. of benzene were added and, finally, 46.5 g. of paraformaldehyde were introduced. The mixture was refluxed for 6 hours during which time 21 ml. of water were removed in the Dean-Starke trap. The solvent benzene was removed by distillation and the residue distilled under vacuum. There were obtained 124 g. of 3-isobutyloxazolidine, boiling at 61° C./20 mm. mercury.

B. *Reaction of acetylene with 3-isobutyloxazolidine.*—There were charged to a one-liter flask equipped with a stirrer, an inlet tube for introducing acetylene and an outlet tube connected to an open-type U-tube mercury manometer, 109 g. of 3-isobutyloxazolidine, 250 ml. of dioxane, and 5 g. of powdered cuprous chloride. The mixture was stirred and acetylene was passed therein under 2 to 3 inches of mercury pressure above atmospheric. The temperature was maintained at around 20–25° C. by means of an ice bath while introducing the acetylene. Over a period of 2 hours a total of 20 g. of acetylene was absorbed. The catalyst was removed from the reaction mixture by filtration, the dioxane removed by distillation at reduced pressure, and the residue fractionated. There were obtained 59 g. of product boiling at 59° C./0.7 mm. The $n_D^{25}$ (refractive index) of this material was 1.4545; non-aqueous titration indicated that 98.8% of the product was the desired compound, N-isobutyl-N-2-propynyl-2-amino-1-ethanol.

*Example II.—N-t-butyl-N-2-propynyl-2-amino-1-ethanol*

A. *Preparation of 3-t-butyloxazolidine.*—This was prepared in the manner described above from t-butylaminoethanol, paraformaldehyde and benzene.

B. *Reaction of acetylene with 3-t-butyloxazolidine.*—To a flask, as described above, there were charged 65 g. of 3-t-butyloxazolidine, 200 ml. of dimethylformamide and 5 g. of cuprous chloride. There were passed in 16 g. of acetylene over a 6-hour period at 15–25° C. The mixture was treated with hydrogen sulfide, charcoal, diatomaceous silica and filtered. The filtrate was stripped of dimethylformamide under reduced pressure and the residue taken overhead to give 41 g. of N-t-butyl-N-2-propynyl-2-amino-1-ethanol, boiling at 63–70° C./0.24 mm. Redistillation of the material yielded product boiling at 98–101° C./15 mm. This material assayed 97.3% by non-aqueous titration and had an $n_D^{25}$ of 1.4665.

*Example III.—N-t-butyl-N(1-n-propyl-2-propynyl)-2-amino-1-ethanol*

A. *Preparation of 3-t-butyl-2-n-propyloxazolidine.*—The oxazolidine was prepared from t-butylaminoethanol and butyraldehyde, using benzene as the azeotroping agent. The procedure used is described above.

B. *Reaction of the oxazolidine with acetylene.*—There were charged to a suitable flask 86 g. of oxazolidine, 200 ml. of dimethylformamide and 10 g. of cuprous chloride. Acetylene was passed into this stirred mixture and there were absorbed 8.5 g. in 3 hours, after which 100 ml. more of dimethylformamide were added and the acetylene passed in again. The mixture then took up an additional 7.5 g. of acetylene over a period of 5 hours, giving a total of 16 g. of acetylene. The mixture was filtered to remove the copper catalyst and the residual copper was removed by passing hydrogen sulfide into the filtrate, adding diatomaceous silica and filtering. Dimethylformamide was removed under reduced pressure and when completely removed, a solid separated in the distilling flask. The solid was removed by filtration and washed with a solvent mixture containing hexanes, heptanes, octanes and solvent naphtha, which was then combined with the filtrate. The filtrate was then stripped of the solvent mixture and the residue distilled to yield 28.5 g. of N-t-butyl-N-(1-n-propyl-2-propynyl)-2-amino-1-ethanol, boiling at 80–83° C./0.5 mm. This material assayed for the above composition as 101% by non-aqueous titration and had an $n_D^{25}$ of 1.4635.

*Example IV.—N-t-butyl-N-2-propynyl-2-phenyl-2-amino-1-ethanol*

A. *Preparation of 3-t-butyl-4-phenyloxazolidine.*—In a flask equipped with a reflux condenser, Dean-Starke trap, stirrer and thermometer, there were charged 79 g. of t-butyl-2-phenyl-aminoethanol prepared by the method outlined in the J. Am. Chem. Soc. 78, 4039 (1956) and 122 g. of paraformaldehyde and 150 ml. of benzene. This mixture was heated with stirring to reflux and the water formed in the reaction separated in the Dean-Starke trap. Benzene was removed under reduced pressure and the residue distilled under high vacuum. There were obtained 77 g. of product boiling at 88° C./0.3 mm., having an $n_D^{25}$ of 1.5138.

B. *Reaction of the oxazolidine with acetylene.*—There were charged to a suitable flask 77 g. of the above oxazolidine, 250 ml. of dimethylformamide and 5 g. of cuprous chloride. Acetylene was passed in at room temperature over a period of 8 hours. There was absorbed a total of 17 g. of acetylene. The mixture was worked up in the above described manner and on distillation yielded 50 g. of material boiling at 130° C./0.25 mm. This material assayed 96.3%. The $n_D^{25}$ was 1.5185.

*Example V.—N-benzyl-N-2-propynyl-2-amino-1-ethanol*

A. *Preparation of 3-benzyloxazolidine.*—There were charged to a suitable flask 755 g. of benzylethanolamine, 800 ml. of benzene, and 180 g. of paraformaldehyde. The mixture was stirred and refluxed and there were taken off in the Dean-Starke trap 95 cc. of water. Benzene was removed at atmospheric distillation and the product distilled under reduced pressure. There was obtained a practically quantitative yield of 3-benzyloxazolidine boiling at 125–127° C./18 mm.

B. *Room temperature reaction of 3-benzyloxazolidine with acetylene.*—There were charged to an appropriate flask, equipped as described in Example I, 83 g. of 3-benzyloxazolidine, 200 ml. of dioxane and 5 g. cuprous chloride. Acetylene was passed into this mixture at 20–30° C. In 3 hours 15 g. of acetylene was absorbed. The mixture was allowed to stand for about 2 days, was filtered from the catalyst, the dioxane removed by distillation under reduced pressure and the residue distilled. There were obtained 54 g. of product, boiling at 124° C./1.5 mm., and 20 g. of material boiling at 124–150° C./1.5 mm. with decomposition. The product in the first fraction was assayed by non-aqueous titration and found to correspond to N-benzyl-N-2-propynyl-2-amino-1-ethanol.

*Pharmacological data and effects.*—The lethal dose 50 (LD50) of this compound was found to be 856 mg./kg. when administered intraperitoneally to mice and 2690 mg./kg. when administered orally, by gastric intubation, to rats. The compound exhibited sedative and hypnotic properties. All the mice in a group given 577 mg./kg. the lowest dose given, became sedate and then hypnotic. In rats the orally administered sedative dose 50 (SD50) and the hypnotic dose 50 (HD50) were found to be 531 mg./kg. and 735 mg./kg. or 20% and 27% of the LD50 respectively. Associated with hypnosis was a loss of response to a painful stimulus which suggested that the rats were actually in an anesthetic state. This effect was of short duration; about 30 minutes in surviving animals so effected.

C. *Low temperature reaction of 3-benzyloxazolidine with acetylene.*—Eighty-three grams of 3-benzyloxazolidine, 200 ml. of dioxane and 5 g. cuprous chloride were charged to a one-liter flask equipped as described in Example I. The mixture was cooled in an ice bath to around 10° C. and the acetylene passed in at this temperature. Over a period of 5 hours 16 g. of acetylene were absorbed. The catalyst was removed by filtration, the dioxane removed by distillation under reduced pressure, and the product distilled. There were obtained 68.5 g. of product boiling at 124–128° C./1.5 mm.

D. *Reaction of 3-benzyloxazolidine with acetylene using acetone solvent.*—Eighty-three grams of 3-benzyloxazolidine, 250 ml. of acetone and 5 g. of cuprous chloride were charged to a one-liter flask equipped as described in Example I. The reaction mixture was cooled in an ice bath before passing in acetylene, and over a period of 6 hours 15 g. of acetylene were absorbed. The catalyst was removed by filtration in the usual manner, the acetone removed by distillation under reduced pressure, and the product distilled. There were obtained 41 g. of product.

E. *Reaction of 3-benzyloxazolidine with acetylene using dimethylformamide as the solvent.*—In a suitable flask, there were charged 87 g. of 3-benzyloxazolidine, 250 ml. of dimethylformamide and 5 g. of cuprous chloride. Acetylene was passed into this mixture with rapid stirring at a pressure of 3–6 inches of mercury above atmospheric. The temperature was controlled at between 5–10° C. There was an extremely rapid absorption of acetylene and after one hour 22 g. of acetylene had taken up by this mixture. To this mixture there was then added diatomaceous silica filter aid, and the mixture was filtered and the cake washed with a small amount of acetone. The filtrate was treated with hydrogen sulfide, charcoal added and then filtered again to remove charcoal and copper sulfide. There was obtained a clear, colorless filtrate which was stripped of acetone and dimethylformamide under reduced pressure. The high boiling material was then distilled and there were obtained 82 g. of product, boiling at 106–110° C./0.25 mm. This constitutes an 82% of theory yield.

F. *Reaction of 3-benzyloxazolidine with acetylene-removal of catalyst with $H_2S$.*—There were charged to a one-liter reaction flash equipped as in Example II, 83 g. of 3-benzyloxazolidine, 200 ml. of dioxane, and 5 g. of cuprous chloride. The mixture was cooled with an ice bath to around 10° C. and acetylene passed in over a period of 4 hours at 5–10° C. The mixture was allowed to stand at room temperature overnight. There were absorbed 15.5 g. of acetylene. The catalyst was removed by filtration, using a filter aid bed. The catalyst cake was washed with dioxane, the wash liquor being combined with the filtrate, and the filtrate treated with hydrogen sulfide to give a copper sulfide precipitate. The copper sulfide was removed by filtration. The resulting filtrate, however, was not clear; therefore, additional hydrogen sulfide was passed in, activated carbon added, and the filtration operation repeated. In this manner a light orange-colored filtrate was obtained. The dioxane was removed by distillation under reduced pressure, and the residue distilled under vacuum to give 70 g. of product boiling at 104–106° C./0.27 mm. There was no decomposition during this distillation.

*Example VI.—N-benzyl-N-(1-phenyl-2-propynyl)-2-amino-1-ethanol*

A. *Preparation of 2-phenyl-3-benzyloxazolidine.*—This oxazolidine was prepared in the manner described in Part A of Example I using 151 g. of benzylaminoethanol, 300 cc. benzene and 106 g. benzaldehyde. There were obtained 200 g. of the desired oxazolidine, boiling at 130° C./1 mm.; $n_D^{25}$ 1.5075.

B. *Reaction of 2-phenyl-3-benzyloxazolidine with acetylene.*—This reaction was run similarly to Example I, Part B, using 119 g. of 2-phenyl-3-benzoxazolidine, 250 cc. dioxane, 10 g. cuprous chloride and 12 g. of acetylene. The batch was worked up in the previously described manner and there were obtained 75 g. of the desired product, boiling at 151–155° C./0.25 mm.; $n_D^{25}$ 1.5695.

*Example VII.—N-benzyl-N-(1-n-propyl-2-propynyl)-2-amino-1-ethanol*

A. *Preparation of 2-n-propyl-3-benzyloxazolidine.*—In the procedure described in Example IV, Part A, above, from 129 g. benzylaminoethanol, 300 cc. benzene and 72 g. of n-butyraldehyde, there were obtained 150 g. of the desired oxazolidine, boiling at 143–145° C./12 mm.; $n_D^{25}$ 1.5076.

B. *Reaction of 2-n-propyl-3-benzyloxazolidine with acetylene.*—By repetition of the procedure of Example IV, Part B, there were obtained from 103 g. of the oxazolidine 200 cc. of dioxane, 10 g. cuprous chloride and 15 g. of acetylene, 95 g. of the desired product, boiling at 115–117° C./3 mm.; $n_D^{25}$ 1.5155.

*Pharmacological data and effects.*—The LD50 of this compound was found to be 1877 mg./kg. when administered intraperitoneally to mice. The compound exhibited sedative and hypnotic properties. All the mice in a group given 1063 mg./kg., the lowest dose given, became sedate; and 60% of those given a 1382 mg./kg. dose became hypnotic.

*Example VIII.—N-benzyl-N-(4-acetoxy-4-methyl-2-pentynyl)-2-amino-1-ethanol*

In a one-liter, three-necked flask there were charged 85 g. of 3-benzyl-oxazolidine, 200 ml. of dioxane, and 10 g. of cuprous chloride. With stirring, there were then added, through the dropping funnel, 50 g. of dimethylethynylcarbinol. Upon addition of the carbinol there was a slight exothermic reaction and the temperature carried to 48° C., at which point it was kept between 45–47° C. with slight cooling by applying an ice bath. The time of addition of the dimethylethynylcarbinol was 40 minutes. The mixture was allowed to stir for 2 hours, whereupon it became very thick and 200 ml. more of dioxane were added to thin it out somewhat. The mixture was allowed to stand over night, hydrogen sulfide was then passed into this mixture, charcoal and diatomaceous silica added and the mixture filtered. There was obtained a clear solution of N-benzyl-N-(4-hydroxy-4-methyl-2-pentynyl)-2-amino-1-ethanol from which dioxane was removed at reduced pressure and the residue treated as follows:

There were added to this residue in a suitable flask equipped with a stirrer, thermometer and dropping funnel, 300 ml. of benzene, 8 g. of pyridine and then, with stirring, 180 g. of acetyl chloride over a period of 30 minutes, keeping the temperature around 75° C. with the aid of an ice bath. The mixture was allowed to stir for an additional 30 minutes and a solution of 92 g. of sodium hydroxide in 150 cc. of water was added slowly, while keeping the temperature below 20° C. with an ice bath. The mixture was then filtered through diatomaceous silica, the pH adjusted to neutrality with sodium carbonate, the upper layer separated and the lower layer extracted with benzene. The benzene extracts were combined with the upper layer and dried over anhydrous potassium carbonate. The benzene was removed at reduced pressure and the residue distilled to yield 125 g. of material, boiling at 167° C./0.26 mm. This material was identified by non-aqueous titration at being N-benzyl-N-(4-acetoxy-4-methyl-2-pentynyl)-2-amino-1-ethanol. This example shows that derivatives, such as acetoxy derivatives, can be prepared from hydroxy-containing compounds of the present invention.

*Example IX.—N-benzyl-N-(4-hydroxy-4-methyl-2-hexynyl)-2-amino-1-ethanol*

In a similar experiment there were charged to the flask 48 g. of 3-benzyloxazolidine, 200 ml. of dioxane, and 5 g. of cuprous chloride. There were then added at 35° C., 25 g. of methylethylethynylcarbinol. The mixture was allowed to stir for 2 hours and then stand over night. Hydrogen sulfide was passed into the mixture, charcoal added and the mixture then filtered. The dioxane was stripped under reduced pressure and the residue distilled to yield 54 g., B.P. 175–180° C./0.26 mm. This material was titrated by the non-aqueous method, and it assayed 99.8% as N - benzyl - N - (4 - hydroxy - 4 - methyl-2-hexynyl)-2-amino-1-ethanol. The $n_D^{25}$ was 1.5366.

*Example X.—N-benzyl-N-(2-heptynyl)-2-amino-1-ethanol*

There were charged 86 g. of 3-benzyloxazolidine, 250 ml. of dioxane and 5 g. of cuprous chloride to a flask equipped as described above. There were then added 46 g. of n-butylacetylene over a period of 20 minutes. There was a slight exotherm upon the addition of the butylacetylene. The reaction mixture was stirred for 5 hours, allowed to stand over night, and then warmed to 50° C. and stirred for an additional 60 hours at 40–50° C. The mixture was filtered, the filtrate treated with hydrogen sulfide, diatomaceous silica added, and then filtered again. The filtrate was stripped of dioxane under reduced pressure and the residue distilled to yield 86 g. of N-benzyl-N-(2-heptynyl)-2-amino-1-ethanol. The $n_D^{25}$ of this material was 1.5202 and it assayed 97% by non-aqueous titration.

*Example XI.—N-isopropyl-N-2-propynyl-2-amino-1-ethanol*

There were charged to a suitable flask 77.5 g. of 3-isopropyloxazolidine (prepared in accordance with the procedure given above), 200 ml. of dioxane and 5 g. of cuprous chloride. Acetylene was passed into this mixture at 10–20° C. and, over a period of 8 hours, 17 g. was absorped (theory, 19 g.). The catalyst was removed by filtration, the filtrate was saturated with hydrogen sulfide, activated carbon added, and the mixture filtered. The dioxane was removed by distillation under vacuum, and the product distilled under vacuum. There were obtained 46.5 g. of the desired product boiling at 96–98° C./0.16 mm. There was a higher-boiling fraction which boiled from 64–145° C./1.5 mm., which was not further characterized.

*Example XII.—N-isopropyl-N-(4-hydroxy-4-methyl-2-hexynyl)-2-amino-1-ethanol*

There were charged to a suitable flask 74 g. of 3-isopropyloxazolidine, which assayed 80% material, 200 ml. of dioxane, 10 g. of cuprous chloride. There were then dropped in over a 30-minute period, keeping the temperature below 40° C. with an ice bath, 50 g. of methylethylethynylcarbinol. The mixture was allowed to stir for 2 hours and then stand overnight. It was worked up in the usual manner. After removal of the dioxane under reduced pressure, the residue was taken overhead to yield 65 g. of N-isopropyl-N-(4-hydroxy-4-methyl-2-hexynyl)-2-amino-1-ethanol. This material assayed 99.7% by non-aqueous titration and had an $n_D^{25}$ of 1.4821.

*Example XIII.—N-isopropyl-N-(4-hydroxy-4-methyl-2-hexynyl)-2-amino-1-ethanol*

In a similar experiment there were charged to a one-liter flask 60 g. of 3-isopropyloxazolidine and 200 ml. of dioxane and the mixture heated to 70° C. at which time 50 g. of methylethylethynylcarbinol were added. No catalyst was used. The mixture was held at 75–80° C. for 7 hours, cooled and distilled. There were recovered isopropyloxazolidine, dioxane and methylethylethynylcarbinol. There was no high boiling product formed. This experiment shows that in the absence of a copper salt as source of cuprous ions no cleavage of the carbon-oxygen bond in the position alpha to a nitrogen atom by an acetylenic compound will occur.

*Example XIV.—N-isopropyl-N-[3-(1-cyclohexanol)-2-propynyl]-2-amino-1-ethanol*

In a similar experiment there were charged to a flask 85 g. of 3-isopropyloxazolidine, 200 ml. of dioxane and 5 g. of cuprous chloride. From the dropping funnel there was then added, with stirring, a solution consisting of 62 g. of 1-ethynylcyclohexanol and 20 cc. of dioxane. The addition of the ethynylcyclohexanol solution took 20 minutes and the maximum temperature reached was 38° C. The mixture was stirred for 2½ hours and then worked up as usual. There were obtained 65 g. of N-isopropyl - N - [3 - (1 - cyclohexanol) - 2 - propynyl] - 2-amino-1-ethanol boiling at 158° C./0.5 mm. The material had an $n_D^{25}$ of 1.5057, and assayed 99% by non-aqueous titration.

*Example XV.—N-isopropyl-N-2-butynyl-2-amino-1-ethanol*

In a flask similar to that used for the acetylene reactions there were charged 60 g. of 3-isopropyloxazolidine, 250 ml. of dioxane and 5 g. of cuprous chloride. Methylacetylene (1-propyne) from a tank was passed into this mixture at 25–30° C. over a 10-hour period, during which time 34 g. of methylacetylene had been absorbed. The mixture was filtered from the catalyst, treated with hydrogen sulfide in the usual manner, stripped of dioxane under reduced pressure, and the residue distilled to yield 63 g. of N-isopropyl-N-2-butynyl-2-amino-1-ethanol which boiled at 64° C./0.6 mm. and assayed 97.3% by non-aqueous titration and had an $n_D^{25}$ of 1.4728.

*Example XVI.—N-isopropyl-N-(4-methyl-4-penten-2-ynyl)-2-amino-1-ethanol*

This experiment was run in a manner similar to that used for butylacetylene. To a one-liter flask there were charged 120 g. of 3-isopropyloxazolidine, 200 ml. of dioxane and 7.5 g. of cuprous chloride. There was then added slowly a solution consisting of 68 g. of isopropenylacetylene in 100 mg. of dioxane. There was an exothermic reaction which carried to 35° C. and the temperature then was kept between 30–35° C. with cooling throughout the addition, which took 25 minutes. The mixture was allowed to stir 3 hours while the mixture gradually cooled. The mixture was then allowed to stand overnight and worked up in the usual manner by filtering, treating with hydrogen sulfide, and removing the low boiling solvent at the water pump. There were obtained 136 g. of product, boiling at 72° C./0.25 mm., which by non-aqueous titration assayed 98% as N-isopropyl-N-(4-methyl-4-penten-2-ynyl)-2-amino-1-ethanol.

*Example XVII.—N-isopropyl-N-2-heptynyl-2-amino-1-ethanol*

In the manner described heretofore, 120 g. of 3-isopropyloxazolidine, 400 ml. of dioxane and 10 g. cuprous chloride were reacted with 86 g. of butylacetylene. The temperature was 33–40° C. during the addition of butylacetylene. The mixture was stirred for 2 hours, heated to 60° C. in 20 minutes, and went to 68° C. for 45 minutes. The heating source was then removed, and the batch allowed to stir and cool to room temperature. The catalyst was removed by filtration and the filtrate treated with hydrogen sulfide, activated carbon and then filtered again. The dioxane was stripped under reduced pressure and the residue distilled under high vacuum to give 165 g. of N-isopropyl-N-2-heptynyl-2-amino-1-ethanol boiling at 88–90° C./0.5 mm. The $n_D^{25}$ was 1.4678.

*Example XVIII.—N-isopropyl-N-(4-hydroxy-2-butynyl)-2-amino-1-ethanol*

A suitable flask was charged with 800 ml. of dioxane and 130 g. (1.13 mole) of 3-isopropyloxazolidine. When 40 g. of cuprous chloride were added, a slight exotherm to 35° C. was noted. From the dropping funnel 125 g. (2.23 mole) of propargyl alcohol were added over a period of 45 minutes. The reaction was exothermic, reaching 49° C. as the maximum temperature. It was allowed to stir for 2 hours, then filtered to remove a yellow solid (copper salt of propargyl alcohol). The filtrate was treated with hydrogen sulfide and filtered to remove the copper sulfide thus precipitated. The filtrate (orange-red in color) was stripped to remove dioxane and excess propargyl alcohol. Distillation under the vacuum pump gave a small forerun of unreacted propargyl alcohol. The product was collected at 147–150° C./0.75 mm.; 91 g.; $n_D^{25}$ —1.4974. A resinous residue of 48 g. remained in the still pot.

*Example XIX.—N-methyl-N-(1-phenyl-2-propynyl)-2-amino-1-ethanol*

By the procedure described above there were obtained from 81 g. of 3-methyl-2-phenyloxazolidine, 200 cc. dioxane, 10 g. cuprous chloride and 8.5 g. acetylene, 41 g. of the desired product boiling at 103° C./0.26 mm.

*Example XX.—N-phenyl-N-2-propynyl-2-amino-1-ethanol*

From 75 g. of 3-phenyloxazolidine, 200 cc. of dioxane, 8 g. of cuprous chloride and 10 g. of acetylene, there were obtained 11 g. of N-phenyl-N-2-propynyl-2-amino-1-ethanol.

*Example XXI.—N-t-octyl-N-2-propynyl-2-amino-1-ethanol*

In a similar experiment 136.5 g. of 3-t-octyloxazolidine, 250 cc. of dioxane, and 5 g. of cuprous chloride were stirred while acetylene was passed into the mixture at room temperature. Over a period of 8 hours there were absorbed 15 g. of acetylene. The mixture was worked up in the usual manner and on distillation, gave 78.5 g. of N-t-octyl-N-2-propynyl-2-amino-1-ethanol boiling at 104–112° C./1.7–2.0 mm. This material had an $n_D^{25}$ of 1.4722 and assayed 101% by non-aqueous titration.

Example XXII.—N-t-octyl-N-(1-n-propyl-2-propynyl)-2-amino-1-ethanol

One hundred fourteen (114) grams of 2-n-propyl-3-t-octyloxazolidine, 300 ml. of dimethylformamide and 7 g. of cuprous chloride were treated with acetylene in the above described manner. Over a period of 4 hours at a temperature of 15–25° C., there were absorbed 16 g. of acetylene. The catalyst was removed by filtration and the filtrate used as such, since there was no coloration indicating residual copper. The dimethylformamide was removed under reduced pressure and the residue distilled. There were obtained 76 g. of product, boiling at 81–85° C./0.75 mm. This material had an $n_D^{25}$ of 1.4561.

II. ACETYLENIC AMINOPROPANOLS

Example XXIII.—N-isobutyl-N-2-propynyl-3-amino-1-propanol

A. *Preparation of 3-isobutyltetrahydro-1,3-oxazine.*—There were charged to a one-liter flask, equipped with a stirrer, a Dean-Starke trap surmounted by a reflux condenser, 200 g. of N-isobutyl-3-amino-1-propanol, 300 ml. of benzene, and 45 g. of paraformaldehyde. The mixture was stirred and refluxed for approximately 5 hours, during which time 27 ml. of water were removed in the Dean-Starke trap. The benzene was removed by atmospheric distillation and the residue distilled under reduced pressure. There were obtained 184 g. of the desired tetrahydro-1,3-oxazine, boiling at 75–80° C./1.8 mm.

B. *Reaction of 3-isobutyltetrahydro-1,3-oxazine with acetylene.*—There were placed in a one-liter flask, equipped with a stirrer and an inlet tube for the introduction of acetylene and an outlet tube connected to an open-type U-tube mercury manometer, 184 g. of the above tetrahydro-1,3-oxazine, 300 ml. of dioxane, and 7 g. of cuprous chloride. Acetylene was passed into the stirred reaction mixture at 3–5 inches of mercury pressure above atmospheric for 10 hours at room temperature. There was absorbed a total of 26 g. of acetylene. The reaction mixture was filtered from the catalyst, the dioxane removed by distillation under reduced pressure and the residue fractionated. The following portions were obtained:

(1) Fifty-five and five tenths (55.5) grams of material boiling at 46° C./0.1 mm. to 52° C./0.4 mm., which consisted of starting material and N-isobutyl-N-2-propynyl-3-amino-1-propanol;

(2) Sixteen (16) grams of material boiling at 52–72° C./0.4 mm., which was mostly the N-isobutyl-N-2-propynyl-3-amino-1-propanol; and (3) Ninety-four (94) grams of N-isobutyl-N-2-propynyl-3-amino-1-propanol boiling at 73° C./0.6 mm. to 76° C./0.75 mm. The $n_D^{25}$ of this material was 1.4579.

Example XXIV.—N-isopropyl-N-2-propynyl-3-amino-1-propanol

There were charged to a one-liter flask, equipped as described above, 130 g. of 3-isopropyltetrahydro-1,3-oxazine (prepared in accordance with the procedure given in Example XXIII, Part A), 10 g. of cuprous chloride and 400 cc. dimethylformamide. This mixture was cooled to 5° C. Actylene was then passed into the reaction mixture. The temperature rose to 9° C. and then fell back to 6° C. The reaction continued at this temperature and 5–6 inches of mercury pressure for 2.5 hours. The temperature was then allowed to rise to 25° C. Thirty-one grams of acetylene were absorbed. The solution was filtered to remove the cuprous salts; the filtrate diluted with 400 cc. acetone and saturated with hydrogen sulfide. The solution was then refiltered to remove the copper sulfide, and the solvent was stripped under vacuum. The product distilled at 112–115° C./17–18 mm., after removing 11.5 g. of first fraction. There was a product yield of 100.5 g. and 25 g. residue. This product material assayed 100% by titration and had $n_D^{25}$ 1.4655.

Example XXV.—N-benzyl-N-2-propynyl-3-amino-1-propanol

Into a one-liter flask equipped as previously described (Example 1, Part B), were placed 145.5 g. of 3-benzyltetrahydro-1,3-oxazine, 350 cc. of dimethylformamide and 8 g. of cuprous chloride. After cooling to 8° C. acetylene was passed in at a pressure of 4–5 inches of mercury. This was continued at a temperature of 5–7° C. for 8 hours, during which time a total of 18 g. of acetylene were absorbed. The batch was filtered, and 400 ml. of acetone were added to the filtrate. This solution was saturated with hydrogen sulfide. Filtration removed solids. Solvents were removed by distillation under a vacuum, and the product was collected at 134–140° C./1.3 mm. The yield was 110 g. of N-benzyl-N-2-propynyl-3-amino-1-propanol; assay, 98.65%; $n_D^{25}$ 1.5320.

Example XXVI.—N-isopropyl-N-(1-n-propyl-2-propynyl)-3-amino-1-propanol

Into a one-liter flask were placed 175 g. of 3-isopropyl-2-n-propyltetrahydro-1,3-oxazine (prepared by refluxing of N-isopropyl-3-amino-1-propanol with n-butyraldehyde according to the procedure described in Example XXIII, Part A), 10 g. of cuprous chloride, and 350 cc. of dimethylformamide. This mixture was cooled to 3° C. and flushed three times with acetylene, which was then allowed to pass into the mixture. A pressure of 6–7 inches mercury and a temperature of 3–5° C. was maintained. Twenty-four grams of acetylene were absorbed. The solution was saturated with hydrogen sulfide after filtering off the copper salts. There was no precipitate of copper salts. The solution, however, was filtered to remove some foreign matter. The filtrate was stripped of the solvent by distillation under vacuum. The product was obtained in a yield of 125 g. and distilled at 127–131° C./11 mm., after removing a 15 g. first fraction to 127° C./11 mm. The product assayed 101.1% and had $n_D^{25}$ 1.4542.

*Analysis.*—Calcd. for $C_{12}H_{23}NO$: C, 73.09; H, 11.67; N, 7.10. Found: C, 72.12; H, 11.44; N, 8.17.

Upon redistillation a first fraction of 10 g. was removed to 128° C./15 mm. and a product fraction boiling at 128° C./15 mm.–135° C./17 mm. was taken. A residue of 5 g. remained. The desired product assayed 99.7% by titration and had $n_D^{25}$ 1.4630.

*Analysis.*—Calcd. for $C_{12}H_{23}NO$: C, 73.09; H, 11.67. Found: C, 72.31; H, 11.60.

Example XXVII.—N-isopropyl-N-(1-phenyl-2-propynyl)-3-amino-1-propanol

Into a one-liter flask equipped for acetylene reaction were placed 250 cc. of dimethylformamide, 12 g. of cuprous chloride and 201 g. of 3-isopropyl-2-phenyltetrahydro-1,3-oxazine, obtained by refluxing N-isopropyl-3-amino-1-propanol with benzaldehyde. The reaction mixture was cooled to 10° C. Acetylene was then passed in under pressure after purging to displace the air. After two hours, 10 g. of acetylene had been absorbed. An additional 7 g. of cuprous chloride were added and the reaction again started and run at 15° C. and 7–8 inches of pressure. Four hours later the mixture had absorbed another 10 g. of acetylene. The solution was filtered to remove the copper salts; the filtrate diluted with 300 cc. acetone and saturated with hydrogen sulfide. The solvent was then stripped to 75° C./13 mm. A first fraction was taken to 90° C. and a second fraction to 110° C./13 mm. Over that, no distillation product could be obtained since there was much decomposition in the flask. The residue was predominantly N-isopropyl-N-(1-phenyl-2-propynyl)-3-amino-1-propanol as determined by non-aqueous titration.

Example XXVIII.—N-benzyl-N-(1-n-propyl-2-propynyl)-3-amino-1-propanol

Into the one-liter flask, described above, were placed 131 g. of 3-benzyl-2-n-propyltetrahydro-1,3-oxazine, 7 g.

of cuprous chloride and 300 cc. of dimethylformamide. This mixture was cooled to 3° C. and addition of acetylene was started. The temperature rose immediately to 8° C., but the mixture was cooled back to 2° C., where the reaction proceeded normally. After three hours 29 g. of acetylene had been absorbed. The reaction material was then allowed to warm to room temperature, and it stood without agitation over the weekend. Then the solution was filtered, treated with hydrogen sulfide and refiltered, whereupon the solvent was removed under vacuum. The product was distilled at 143–147° C./0.75 mm. after removal of 2.5 g. first fraction. There was 20.5 g. residue and a yield of 120 g. of product. The desired product assayed 98.2% by titration and had $n_D^{25}$ 1.5185.

Analysis.—Calcd. for $C_{16}H_{23}NO$: C, 78.4; H, 9.38; N, 5.7. Found: C, 78.93; H, 8.84; N, 6.24.

*Example XXIX. — N-isobutyl-N-2-heptynyl-3-amino-1-propanol*

Into a one-liter flask were placed 143 g. of 3-isobutyltetrahydro-1,3-oxazine (prepared as described in Example XXIII, Part A), 10 g. cuprous chloride and 350 cc. dimethylformamide. This mixture was cooled to 22° C. Eighty-six grams of 1-hexyne were added over 25 minutes with a consequent rise of the temperature to 31° C. The reaction mixture was stirred overnight at room temperature, then heated, whereupon the temperature rose to 105° C. in 5 minutes. The reaction was observed to be exothermic. The reaction mixture was cooled to 60° C. and maintained at this temperature for 2.5 hours, and then cooled to 25° C. The mixture was filtered, diluted with 400 cc. of acetone, treated with hydrogen sulfide, and refiltered. The solvent was stripped under vacuum. A first fraction was removed to 120° C./1.3 mm., weighing 4 g. The product boiling 120–130° C./1.3 mm. weighed 183 g., and the third fraction, 130–145° C./1.3 mm., weighed 5.5 g. The weight of the residue was 17.5 g. The first fraction had $n_D^{25}$ 1.4505, the second fraction, $n_D^{25}$ 1.4630, and assayed 96.4%, the third fraction, $n_D^{25}$ 1.4648, and assayed 91%.

Analysis.—Calcd. for $C_{14}H_{25}NO$: C, 74.66; H, 12.00; N, 6.22. Found: C, 74.88; H, 11.92; N, 6.35.

*Example XXX. — N-isobutyl-N-(4-methyl-4-hydroxy-2-pentynyl)-3-amino-1-propanol*

Into a one-liter flask were charged 13 g. of cuprous chloride, 500 cc. of dimethylformamide and 196.5 g. of 3-isobutyltetrahydro-1,3-oxazine. At a temperature of 23° C., 130 g. of dimethylethynylcarbinol were added over 40 minutes with the reaction exotherming slightly to 34° C. The reaction mixture was allowed to stir overnight at room temperature, then heated to 50–55° C. and held for one hour. The color changed from yellow to reddish-brown. The mixture was then cooled to room temperature, diluted with 200 cc. acetone and saturated with hydrogen sulfide. The solution was filtered to remove the solids. The solvent was stripped off under vacuum. There was a yield of 241.5 g. of a product that distilled at 160–170° C./1.5 mm. It assayed 95.7% and had $n_D^{25}$ 1.4755.

Analysis.—Calcd. for $C_{13}H_{25}NO_2$: C, 68.5; H, 11.0; N, 6.2. Found: C, 68.59; H, 10.86; N, 4.76.

Upon redistillation a first fraction was removed to 138° C./0.75 mm. A second fraction boiling at 126° C./0.35 mm. to 130° C./0.2 mm., and a third fraction at 130–131° C./0.2 mm. were obtained. The respective weights of these three fractions were 16 g., 186 g. and 8 g. The residue amounted to 10 g. The desired product (second fraction) assayed 99.79% and had $n_D^{25}$ 1.4712.

Analysis.—Calcd. for $C_{13}H_{25}NO_2$: N, 6.17. Found: N, 6.37.

*Example XXXI. — N-isobutyl-N-(4-methyl-4-penten-2-ynyl)-3-amino-1-propanol*

Into a one-liter flask there were placed 194 g. of 3-isobutyltetrahydro-1,3-oxazine, 13 g. of cuprous chloride and 400 cc. of dimethylformamide. At a temperature of 23° C., 115 g. of isopropenyl acetylene were added through a dropping funnel over a period of 45 minutes. The temperature rose to 26° C. The reaction mixture was then stirred for one hour, heat was applied, and the temperature rose to 65° C. The mixture was then allowed to cool to 50° C., was held at 50–55° C. for one hour, cooled to room temperature, and allowed to stir overnight. The solution was saturated with hydrogen sulfide and diluted with 250 cc. of acetone. Through filtration the solids were removed and the solvent was stripped off under reduced pressure. The desired product was distilled at 115–123° C./1.3 mm., after removing a small first fraction. The yield was 239 g. and the residue 30 g. The product had $n_D^{25}$ 1.4782.

Analysis.—Calcd. for $C_{13}H_{23}NO$: C, 74.64; H, 11.0; N, 6.7. Found: C, 74.57; H, 10.82; N, 7.1.

III. BIS(ACETYLENIC) AMINES

*Example XXXII. — N,N - bis(4 - methyl-4-hydroxy-2-pentynyl)isopropylamine*

A. *Preparation of bis(isobutoxy methyl) isopropylamine.*—In a two-liter, three necked flask equipped with reflux condenser, stirrer and dropping funnel were placed 185 g. isobutanol, 60 g. paraformaldehyde and 200 ml. benzene. To this stirred mixture were added from a dropping funnel 59 g. isopropylamine. The temperature rose to 50° C. The flask was then equipped with a Dean-Starke trap and overhead reflux condenser. A total of 38 ml. water was removed in the Dean-Starke trap. The flask contents were then distilled to remove 230 ml. of a benzene-isobutanol mixture. The crude amine product was not further isolated.

B. *Reaction of amine with substituted acetylene.*—The crude product obtained above was charged to a 2-liter, three necked flask equipped with reflux condenser, stirrer, dropping funnel and thermometer. Dioxane (250 ml.) and 5 g. cuprous chloride were added. Then with rapid stirring were added 168 g. of 3-methyl-3-hydroxy-1-butyne. The exothermic reaction was held at about 45–50° C., by means of ice bath cooling. This reaction was stirred for 2¾ hours and then allowed to stand overnight. The reaction mixture was then filtered, the filtrate treated with hydrogen sulfide and decolorizing carbon and again filtered to remove last traces of copper catalyst. The solvent was removed by reduced pressure distillation, and the residue put through a short path wiped film evaporator at 0.2–0.3 mm. and 140° C. There were obtained 150 g. of a clear yellow viscous liquid product having $n_D^{25}$ 1.4896 and assaying 104% by non-aqueous titration. Infra-red spectroscopy analysis confirmed the structure of N,N-bis(4-methyl-4-hydroxy-2-pentynyl)isopropylamine. Nitrogen analysis of the product found 6.02 weight percent nitrogen (theory —5.96 weight percent). This product is useful as a surfactant since 0.1 g. in 100 ml. distilled water lowered the surface tension from 75 dynes/cm. down to 59.0 dynes/cm.

The structure of the above compound was also proved by reacting it with potassium hydroxide. Acetone was distilled off and the residue further distilled to collect a product identified by infra-red spectroscopy as N,N-bis(propargyl)isopropylamine. This product assayed 100.8% by non-aqueous titration, contained 10.6 weight percent nitrogen (theory for $C_9H_{13}N$ is 10.32 percent) and had $n_D^{25}$ 1.4612.

Example XXXIII.—N,N-bis(4-methyl-4-hydroxy-2-pentynyl)benzylamine

The procedure described above was carried out with 185 g. isobutanol, 60 g. paraformaldehyde, 200 ml. benzene and 93 g. benzylamine to form a bis-(isobutoxymethyl)benzylamine. This product was then reacted with 3-methyl-2-hydroxy-1-butyne in the presence of dioxane solvent and cuprous chloride to form N,N-bis(4-methyl-4-hydroxy-2-pentynyl)benzylamine. The structure of this product was confirmed by infra-red spectroscopy. This product was an extremely viscous yellow liquid having $n_D^{25}$ 1.5313 and assayed at about 103% by non-aqueous titration. This product is useful as a surfactant since 0.1 g. in 100 ml. distilled water lowered the surface tension from 75 dynes/cm. down to 54.2 dynes/cm.

The structure of the above compound was also proved by reacting it with potassium hydroxide. Acetone was distilled off and the residue further dsitilled to collect a product identified by infra-red spectroscopy as N,N-bis-(propargyl)benzylamine. This product assayed 97.6% by non-aqueous titration and contained 7.68 weight percent nitrogen (theory for $C_{13}H_{13}N$ is 7.65 percent).

Example XXXIV.—N,N-bis(2-heptynyl) isopropylamine

The starting material, bis(isobutoxymethyl)isopropylamine was prepared according to the procedure of Example XXXII above. This material was purified by distillation and the purified product had boiling point of 124–130° C./20–21 mm. and $n_D^{25}$ 1.420. This compound is reported in the literature to have boiling point of 119° C./1 mm. and $n_D^{25}$ 1.4215. This intermediate (39 g.) was reacted with 30 g. n-butylacetylene, 100 ml. dioxane and 2 g. cuprous chloride. The exothermic reaction was carried out at 52° C. for 1 hour with stirring and then the reaction mixture was allowed to stand for 4 days in a stoppered flask. The reaction product was filtered, treated with hydrogen sulfide, activated carbon, filtered again and the solvent removed under vacuum. A 29 g. yield of product was obtained under high vacuum distillation having boiling point of 108° C./0.35 mm.–109° C./0.2 mm. and assayed 96.3% by non-aqueous titration. Infra-red spectroscopy confirmed the structure of N,N-bis(2-heptynyl)isopropylamine.

IV. PROPARGYL DISUBSTITUTED AMINES

Example XXXV.—N-propargyl-N-benzylmethylamine

Into a 1-liter flask equipped with a Dean-Starke trap and reflux condenser were charged 111 g. isobutanol, 30 g. paraformaldehyde, 200 ml. benzene and 121 g. benzylmethylamine. The reaction mixture was refluxed and 18 ml. water was collected in the Dean-Starke trap. Distillation then removed 200 ml. benzene. The reaction product consisting essentially of N-isobutoxymethyl-N-benzylmethylamine was cooled, placed in a reaction flask along with 200 ml. dioxane and 5 g. cuprous chloride catalyst. The mixture was cooled to 10° C. and acetylene slowly bubbled in for 3 hours at which time 25 g. acetylene had been absorbed. The reaction mixture was allowed to stand for 2 days under acetylene atmosphere. The reaction product was then filtered, treated with hydrogen sulfide, activated carbon, filtered again and solvent removed at reduced pressure. The residue was distilled through a 12 inch column packed with stainless steel McMahon saddles to yield 79 g. of product having a boiling point of 89–92° C./5 mm. The hydrochloride salt of the N-propargyl-N-benzylmethylamine was prepared by known techniques. This hydrochloride salt has known utility in the pharmaceutical art. The hydrochloride salt was analyzed.

*Analysis.*—Calcd. for $C_{11}H_{14}NCl$: N, 7.18; Cl, 18.16; melting point of 159–160.5° C. Found: N, 7.12; Cl, 17.46.

What is claimed is:

1. A compound of the formula:

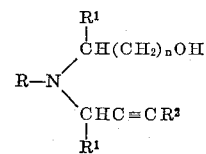

wherein R is selected from the class consisting of alkyl radicals of 1 to 8 carbon atoms and benzyl radical; $R^1$ is selected from the class consisting of the hydrogen atom, propyl and phenyl radicals; $R^2$ is selected from the class consisting of the hydrogen atom, alkyl radicals of 1 to 4 carbon atoms, alkenyl radicals of 3 carbon atoms, monohydroxyalkyl radicals of 1 to 4 carbon atoms and monohydroxycyclohexyl radical; and $n$ is an integer from 1 to 2 inclusive.

2. N-isobutyl-N-2-propynyl-2-amino-1-ethanol.
3. N-benzyl-N-2-propynyl-2-amino-1-ethanol.
4. N - isopropyl-N-(4-hydroxy-4-methyl-2-hexynyl)-2-amino-1-ethanol.
5. N-isopropyl-N-2-heptynyl-2-amino-1-ethanol.
6. N - t - octyl - N-(1-n-propyl-2-propynyl)-2-amino-1-ethanol.
7. N-isobutyl-N-2-propynyl-3-amino-1-propanol.
8. N-benzyl-N-2-propynyl-3-amino-1-propanol.
9. N - isopropyl - N-(1-n-propyl-2-propynyl)-3-amino-1-propanol.
10. N-isobutyl-N-2-heptynyl-3-amino-1-propanol.
11. N - isobutyl-N-(4-methyl-4-penten - 2 - ynyl)-3-amino-1-propanol.
12. A process which comprises reacting a compound selected from the class of compounds having the formulae:

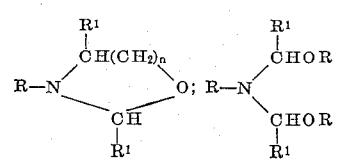

and

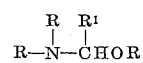

wherein R is selected from the class consisting of alkyl radicals of 1 to 8 carbon atoms, phenyl and benzyl radicals; $R^1$ is selected from the class consisting of the hydrogen atom, propyl and phenyl radicals; and $n$ is an integer from 1 to 2 inclusive, with an acetylene compound having the formula $HC{\equiv}CR^2$, wherein $R^2$ is selected from the class consisting of the hydrogen atom, alkyl radicals of 1 to 4 carbon atoms, alkenyl radicals of 3 carbon atoms, monohydroxyalkyl radicals of 1 to 4 carbon atoms and monohydroxycyclohexyl radical in the presence of cuprous ions and non-aqueous solvent, and recovering a product selected from the class of compounds having the formulae:

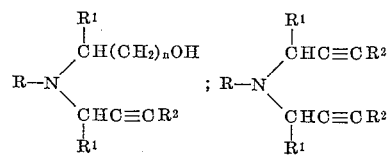

and

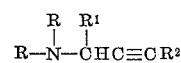

wherein R, $R^1$, $R^2$ and $n$ are defined above.

13. A process which comprises reacting a compound having the formula:

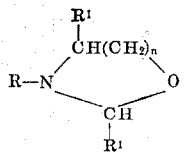

wherein R is selected from the class consisting of alkyl radicals of 1 to 8 carbon atoms, phenyl and benzyl radicals; $R^1$ is selected from the class consisting of the hydrogen atom, propyl and phenyl radicals; and $n$ is an integer from 1 to 2 inclusive, with an acetylene compound having the formula $HC \equiv CR^2$, wherein $R^2$ is selected from the class consisting of the hydrogen atom, alkyl radicals of 1 to 4 carbon atoms, alkenyl radicals of 3 carbon atoms, monohydroxyalkyl radicals of 1 to 4 carbon atoms and monohydroxycyclohexyl radical, in the presence of cuprous ions and non-aqueous solvent, and recovering a product having the formula:

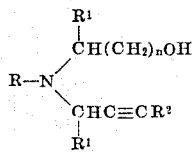

wherein R, $R^1$, $R^2$ and $n$ are defined above.

14. A process which comprises reacting a compound having the formula:

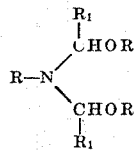

wherein R is selected from the class consisting of alkyl radicals of 1 to 8 carbon atoms, phenyl and benzyl radicals; and $R^1$ is selected from the class consisting of the hydrogen atom, propyl and phenyl radicals, with an acetylene compound having the formula $HC \equiv CR^2$, wherein $R^2$ is selected from the class consisting of the hydrogen atom, alkyl radicals of 1 to 4 carbon atoms, alkenyl radicals of 3 carbon atoms, monohydroxyalkyl radicals of 1 to 4 carbon atoms and monohydroxycyclohexyl radical, in the presence of cuprous ions and non-aqueous solvent, and recovering a product having the formula:

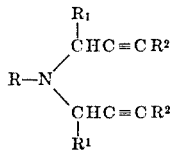

wherein R, $R^1$ and $R^2$ are defined above.

15. A process which comprises reacting a compound having the formula:

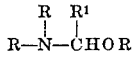

wherein R is selected from the class consisting of alkyl radicals of 1 to 8 carbon atoms, phenyl and benzyl radicals; and $R^1$ is selected from the class consisting of the hydrogen atom, propyl and phenyl radicals, with an acetylene compound having the formula $HC \equiv CR^2$, wherein $R^2$ is selected from the class consisting of the hydrogen atom, alkyl radicals of 1 to 4 carbon atoms, alkenyl radicals of 3 carbon atoms, monohydroxyalkyl radicals of 1 to 4 carbon atoms and monohydroxycyclohexyl radical, in the presence of cuprous ions and non-aqueous solvent, and recovering a product having the formula:

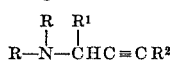

wherein R, $R^1$ and $R^2$ are defined above.

References Cited by the Examiner

UNITED STATES PATENTS 2,884,455   4/1959   Robertson et al. ____ 260—570.8

FOREIGN PATENTS 510,904   8/1939   Great Britain.

OTHER REFERENCES

Reppe et al.: "Ann.," vol. 596, pp. 2, 7–8 and 12 (1955) QD1L7.

Reppe et al.: (II), "Chemical Abstracts," vol. 50, p. 16777(b) (1956) QD1A51.

Wolf: "Ann.," vol. 576, pp. 36 and 42 (1952) QD1L7.

CHARLES B. PARKER, *Primary Examiner.*

ROBERT V. HINES, *Assistant Examiner.*